Aug. 26, 1952  J. ARCHER  2,607,935
SCREW THREADING DIE AND ITS MANUFACTURE
Filed Sept. 26, 1949  4 Sheets-Sheet 1
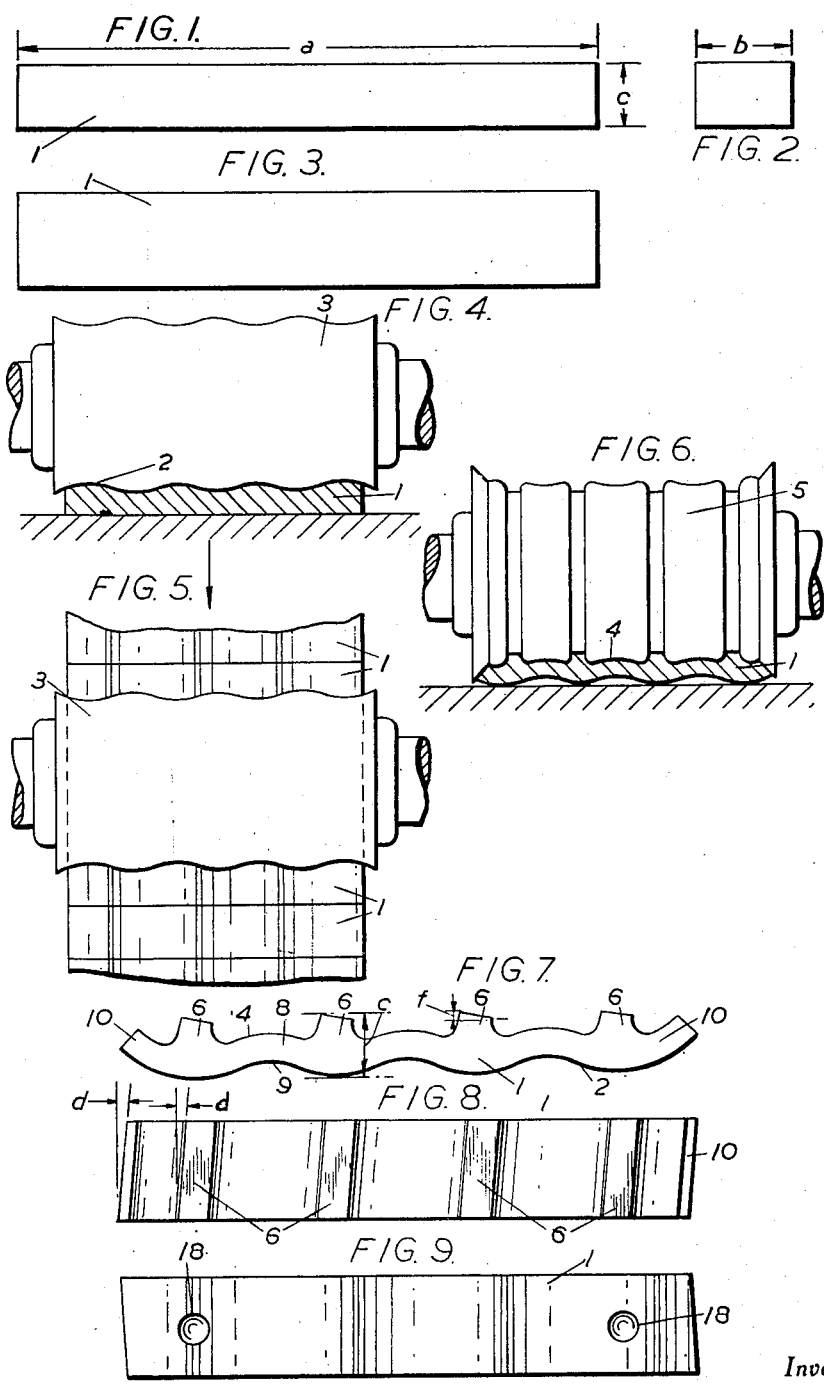
Inventor
John Archer
By Watson, Cole,
Grindle & Watson
Attorney

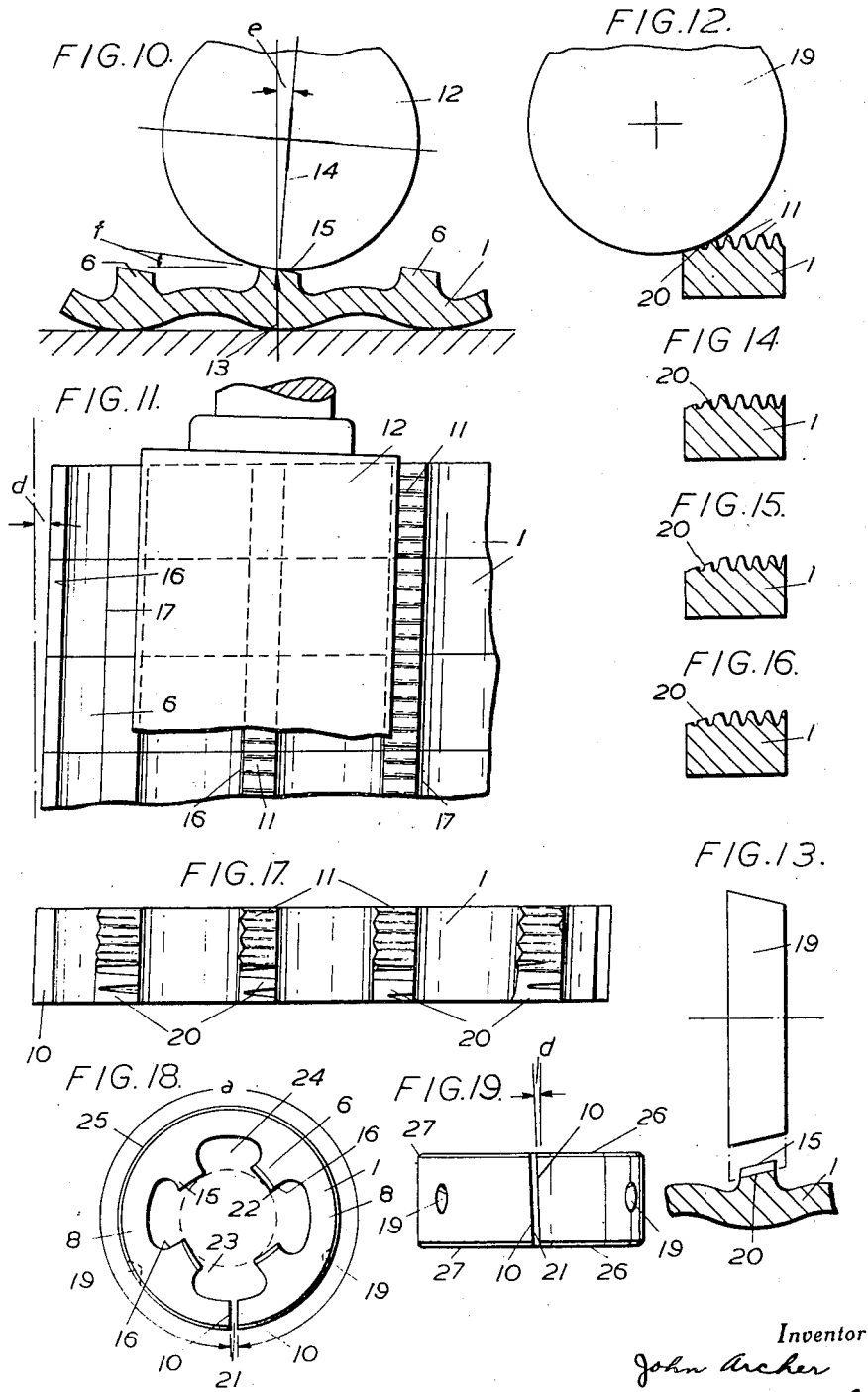

Aug. 26, 1952     J. ARCHER     2,607,935
SCREW THREADING DIE AND ITS MANUFACTURE
Filed Sept. 26, 1949     4 Sheets-Sheet 3
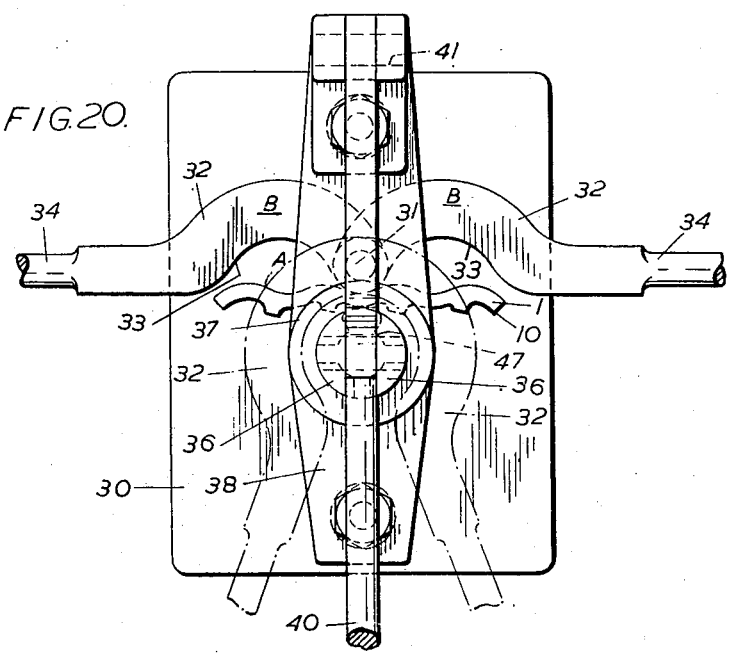
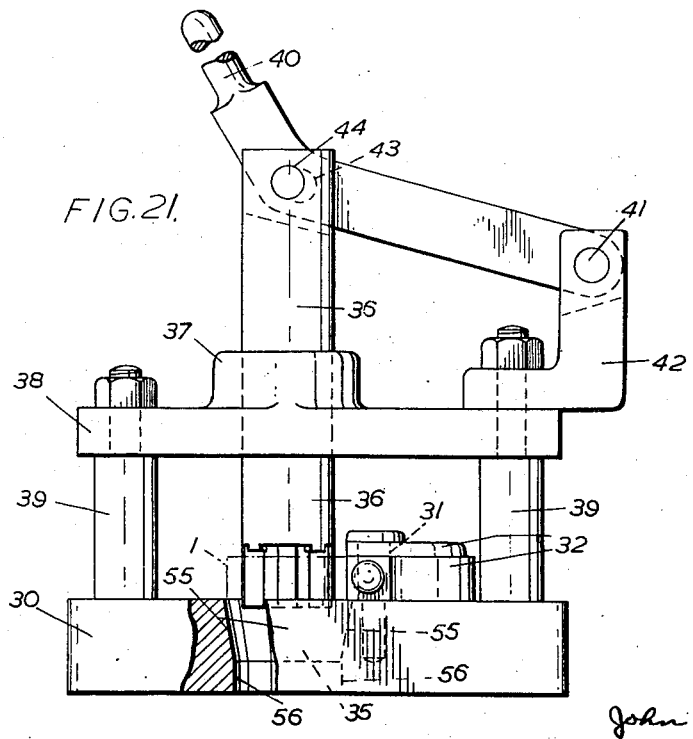
Inventor
John Archer
By Watson, Cole,
Grindle & Watson
Attorney

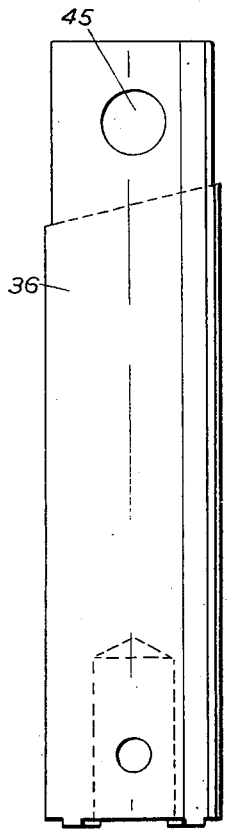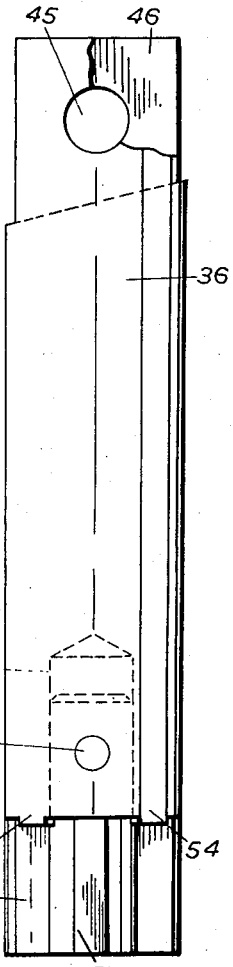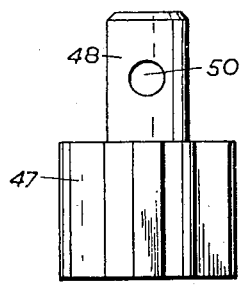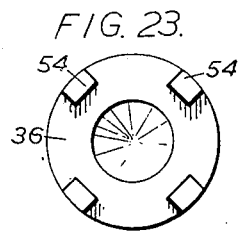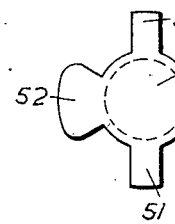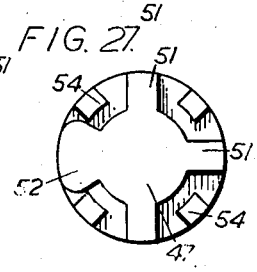

Patented Aug. 26, 1952

2,607,935

UNITED STATES PATENT OFFICE 2,607,935

SCREW THREADING DIE AND ITS MANUFACTURE

John Archer, Sheffield, England, assignor to English Steel Corporation Limited, Sheffield, England Application September 26, 1949, Serial No. 117,853
In Great Britain October 9, 1948

14 Claims. (Cl. 10—111)

1

This invention relates to screwing dies of the split or solid type as ordinarily formed by boring, tapping, and gapping a length of rod. This method of manufacturing such dies does not readily permit the thread form to be relieved behind the cutting edges, and it is also difficult for lead to be given to the successive edges inwards from one face of the die; it forms the cutting edges from the steel near the center of the blank, these cutting edges, moreover, running longitudinally with the grain of the steel; and it calls for individual machining of each die.

The objects of the present invention are to provide a die with correctly relieved thread form and with the lead given to the cutting edges, to form the threads with the cutting edges running substantially parallel to the grain of the steel, and preferably from steel near the outside surface of the stock; and to enable the machining to be carried out simultaneously on a batch of dies.

According to the present invention, a screwing die is first formed as a metal strip with spaced protrusions on one face, thread sections are formed in the faces of the protrusions with the threads in the general direction of but slightly inclined with respect to the length of the strip, and the strip is then bent into a closed figure with the protrusions inwards and the threaded faces lying about a circle with the inclined threads lying in a continuous helix.

All parts of the strip are readily accessible for machining, which is of special advantage in relieving the threads and cutting a lead at one end of each thread section; the cutting face of each section may be cut at a slight angle; and several strips may be simultaneously formed, and simultaneously threaded.

Dies are usually cylindrical, and a cylindrical exterior may be accurately formed by forming one face of the strip with convex portions opposite the protrusions, intervening concave portions taking the same curvature as the convex portions when the strip is bent.

Oil, water, or air-hardening may accompany the setting of the strip into its bent form, the strip preferably being held to that form during setting. A mandrel with radial projections, of which one may conform to the desired finished shape of the gaps between the protrusions, may be used to obtain concentric bending, the projections intermeshing with the protrusions as the strip is bent. Arched bending levers may be used to control the external form.

Endwise pressure may be applied to bring the edges of the bent strip into flat planes, e. g. by means of a plunger carrying the mandrel, and the bent strip may be forced endwise into a sizing recess, e. g. through a taper lead.

Although the shaping of the strip may be carried out on plain bar of rectangular section, using milling, grinding, or other operations, or combinations of operations, the strip may be rolled or stamped to the approximate shape required for the protrusions and the intervening portions, thus leaving relatively little metal to be removed by machining. In this way, most of the previously-mentioned advantages may be obtained, though the pre-forming by rolling may not align the cutting edges so precisely with the grain as in the case of machining from plain rolled strip.

Figures 1, 2, and 3 are side and end elevations and plan respectively of a strip of rolled bar stock;

Figure 4 and Figure 5 are elevation and plan of the milling of one face of the stock;

Figure 6 is an elevation of the milling of the other face of the stock;

Figures 7 and 8 are side elevations and plan respectively of the milled stock;

Figure 9 is a reverse plan of Figure 8;

Figures 10 and 11 are elevation and plan respectively of the milling of the thread teeth;

Figures 12 and 13 are end and side elevations respectively showing the milling of the lead of the teeth;

Figures 14, 15, 16 show the lead applied to different sections of teeth;

Figure 17 is a plan of the stock with milled teeth;

Figure 18 shows the completely milled stock bent to form a circular die;

Figure 19 is a side elevation of the die;

Figure 20 is a plan and Figure 21 is a side elevation (partly in section) of a hand-operated machine for bending the stock;

Figures 22 and 23 are a side elevation and reversed plan respectively of part of Figures 20 and 21;

Figures 24 and 25 are corresponding views of a further part; and

Figures 26 and 27 are corresponding views of the parts of Figures 22 to 25 assembled together.

The strip stock 1 of Figures 1 to 3 is a length approximating to the periphery $a$ of the circular die to be produced and of width $b$ slightly greater than the depth of the die (see Figures 18 and 19); the remaining dimension $e$ is sufficient to provide for the stock to be machined on both faces to the profile as shown in Figure 7. The stock 1 is given a sinuous profile 2 on one face by means of a solid milling cutter 3 as shown in Figures 4 and 5, a number of stocks 1 placed edge to edge being conveniently milled in one operation. The stock 1 is then milled on the other face to the profile 4 by means of a gang milling cutter 5 as shown in Figure 6, the direction of cut being at a slight angle $d$ to the normal, as shown in Figures 8 and 11. (No attempt is made to show the cutting teeth on any of the milling cutters.)

The profile 4 produces on one face of the stock 1 four protrusions 6 (Figures 7 and 8) lying opposite the outer portions 7 of the wave-form or sinuous profile 2 at the other face. The curvature of the portions 7 corresponds to that of the periphery of the circle into which the strip is to be bent. Between the protrusions 6, the profile 4 conforms at 8 to the inner part 9 of the profile 2 of reverse curvature to the portions 7. The ends 10 of the strip thus formed are substantially normal to the end portions of the profiles 2 and 3, and, as seen in Figure 8, also make the small angle $d$ to the normal to the length of the strip. The reference numeral 1 is retained for all stages in the shaping and manipulation of the stock or strip.

The protrusions 6 are formed with thread teeth 11 by means of the milling cutter or hob 12, as shown in Figures 10 and 11. The axis of the cutter 12 is set back with respect to the centre line 13 of each protrusion, so that the normal line 14 makes an angle $e$ to the vertical, the toothed face 15 then formed on each protrusion 6 being correspondingly inclined to the horizontal as shown at $f$ (Figures 7 and 10). The faces of the protrusions as formed by the milling cutter 5 may be given an inclination approximating to $f$ to reduce the amount of material to be removed by the milling cutter 12; but, since the faces 15 have to be finally shaped by the cutter 12, it is not essential that the cutter 5 should initially shape the faces 15, and Figure 6 the cutter 5 is shown leaving the faces of the protrusions untouched.

The cutter 12 may operate simultaneously on the corresponding protrusions 6 of a number of strips 1, as shown in Figure 11, the leading and rear faces 16, 17 of the protrusions being set in line to provide for the small angle $d$ that each makes with the normal, and the axis of the cutter 12 being parallel to these faces.

For cutting some materials, the face 16 may be otherwise than normal to the length of the threads 11; in the initial milling of the profile 4 any angle $d$ (even zero angle) may be readily provided for.

Each protrusion 6 or a single strip has its section of thread teeth milled as a separate operation, with the length of the teeth 11 not only normal to the faces 16, 17 (Figure 17) but slightly advanced from protrusion to protrusion along the length of the strip, as may be seen from Figures 12, 14–16, and 17. Thus, when the strip is bent into a circle (Figure 18), the corresponding tooth of successive protrusions lies in a continuous helix.

Before bending of the strip, one or more driving or size-adjusting dimples 18 are formed on the profile face 2, and one end of each protrusion is milled by a cutter 19 (Figures 12 and 13) to produce a lead 20 extending over say the tips of say three teeth and, as shown in Figure 13, substantially parallel to the inclined face 15.

The strip is now ready to be bent to the circular shape shown in Figure 18, with the ends 10 either separated by a small gap 21, or made to abut—as may be desired for welding the strip into a solid ring. The inclined faces 15 of the toothed protrusions cause the tips 22 of the teeth to lie on the same circle or cylinder 23 and the length of the teeth to be relieved rearwardly of the tips. The portions 8 of the strip between the protrusions define the shapes of cavities 24 into which the chips removed by the teeth 11 can pass. These cavities can thus be substantial in size, yet the gradual thickening into the protrusions 6 gives each of the latter a strong root springing from the generally circular exterior of the die. As shown in Figure 9, the ends 10 still preserve the small angle $d$ of their original formation, and thus lie parallel to each other.

The fibres of the original stock 1 running parallel to the length of the strip, the teeth 11 likewise run substantially parallel to the fibres.

Instead of starting with plain rolled stock, a stock may be used which is already shaped, on one or both faces, e. g. by rolling or stamping to the form shown in Figure 7, with the advantage of minimum amount of material to be removed by machining, though not necessarily with the fibres running in the lengthwise direction of the finished teeth 11.

After bending and hardening of the strip, the periphery 25 is ground to size, as also the faces 26, preferably with a slight chamfer 27. The leading faces 16 may, if desired, be ground; as also the threads 11, but in general it is possible for the thread form after bending of the strip and hardening to have the same order of accuracy as a corresponding size of die produced by boring and tapping, and no finishing of the thread is then necessary.

The bending of the strip may be carried out in a machine as shown in Figures 20 and 21, comprising a base 30 provided with a common pivot 31 for two levers 32 each arched at 33 near the pivot to correspond to half of the desired external shape of the die, with due allowance for final grinding of the die to size. The levers are swung by handles 34 about the pivot 31 until the arches form a substantially complete circle co-axial with an aperture 35 in the base 30. In line with the aperture 35 is a plunger 36 guided through a boss 37 on a plate 38 carried by pillars 39 from the base 30 and movable vertically by means of a lever 40 pivoted at 41 on a bracket 42, a slot 43 in the lever surrounding a pin 44 passing through holes 45 in the slotted upper end 46 of the plunger 36.

A mandrel 47 is aligned with the lower end of the pluger 36 by means of a stem 48 fitting a bore 49, and secured by a transverse pin 50. The mandrel 47 has the section shown in Figure 25, with three narrow radial projections 51 and a fourth wider projection 52, all at uniform intervals. The projection 52 has a profile closely corresponding to that which the inside of one of the intermediate portions 8 of the strip 1 is to assume when the strip has been bent. The lenght of the profiled head of the mandrel 47 is rather greater than width of the strip. When the protrusions 6 lie at a angle $d$, the mandrel projection 51, 52 should lie at a similar angle.

With the strip 1 heated to a temperature suitable for bending and hardening, it is inserted symmetrically between the profile projection 52 of the mandrel 47 and the pivot 31 (Figure 20) and the arms 32 are swung about the pivot 31 to roll or fold the two protruding wings of the strip about the mandrel, the projection 52 defining the initial bending of the central portion 8 of the strip. The projections 51 provide abutments in the other intermediate portions 8 and ensure that the original sinuous profile 2 is brought substantially to circular form within the enfolding arches 33.

The bending of the strip may itself not suffice to bring the ends 10 into exact alignment, and the plunger 36 is therefore depressed to apply endwise pressure to the still hot strip. The end face 53 of the plunger has four projections 54 lying between the projections 51, 52 of the mandrel 47 (Figure 27), and therefore in a position to contact with the ends of the four protrusions 6 in one face of the bent strip.

Pressure from the plunger forces the bent strip into the cavity 35, which at its upper end is formed with a taper portion 55 leading to a lower parallel portion 56 of a diameter closely conforming to the rough bent diameter of the strip. The pressure required to force the strip into the parallel portion 56 ensures that the upper and lower faces 26 of the strip are brought substantially parallel to each other, and the ends 10 brought to the desired distance apart—or even made to abut each other.

Whilst lying in the portion 56, the bent strip is hardened and may then be ejected by further depression of the plunger 36.

The bending of the strip may also be performed in a press with one plunger to hold the strip to a mandrel as described above, and other plungers to force successive portions of the strip round the mandrel. Again, the mandrel may rotate to carry the strip through a gap that forces the strip round the mandrel; there may be a roller forming one gap and a curved guide forming a longer concentric gap. As a modification, the mandrel may remain stationary, and the roller and/or guide then rotate about the mandrel.

What I claim is:

1. Method of forming a screwing die comprising forming a longitudinally fibered metal strip with integral transverse spaced protrusions on one face, forming thread sections in the faces of the protrusions with the threads in the general direction of the length of the strip, but slightly inclined transversely with respect to the length of the strip, and bending the strip into a closed figure with the protrusions inwards and the threaded faces lying about a circle with the inclined threads lying in a continuous helix.

2. Method as in claim 1, comprising forming the threaded faces of the protrusions inclined with respect to the thickness of the strip to provide relief when the strip has been bent.

3. Method as in claim 1, comprising forming a lead at the ends of the protrusions before bending the strip.

4. Method as in claim 1, comprising exerting endwise pressure after bending to bring the edges of the strip into flat planes forming the end faces of the die.

5. Method as in claim 4, comprising using the endwise pressure to press the die into a recess for sizing the outside dimensions of the die.

6. Method as in claim 1, comprising heating the strip before bending, and cooling the bent strip whilst it is held to shape.

7. Method of forming a screwing die comprising forming a longitudinally fibered metal strip with integral transverse spaced protrusions on one face, forming convex curvatures on the other face immediately opposite the protrusions, with concave portions intervening between the convex portions, forming thread sections in the faces of the protrusions with the threads in the general direction of the length of the strip, but slightly inclined transversely with respect to the length of the strip, and bending the strip into a cylindrical die of outside diameter corresponding to the radius of the convex portions, with the protrusions inwards and the threaded faces lying about a circle with the inclined threads lying in a continuous helix.

8. A screwing die consisting of a longitudinally fibered metal strip with integral transverse spaced protrusions on one face, thread sections being formed in the faces of the protrusions with the threads in the general direction of the length of the strip, but slightly inclined transversely with respect to the length of the strip, and the strip being bent into a closed figure with the protrusions inwards and the threaded faces lying about a circle with the inclined threads lying in a continuous helix, the direction of the fibres in the strip extending around the closed figure.

9. A screwing die as in claim 8, wherein the threaded faces of the protrusions are inclined to provide relief.

10. A screwing die as in claim 8, wherein the front face of each protrusion is formed at a slight angle to the width of the strip.

11. A screwing die as in claim 8, wherein the ends of the bent strip are welded together.

12. A screwing die consisting of a longitudinally fibered metal strip with integral transverse spaced protrusions on one face, thread sections being formed in the faces of the protrusions with the threads in the general direction of the length of the strip, but slightly inclined transversely with respect to the length of the strip, and the strip being bent with the protrusions inwards into a closed cylindrical figure, the threaded faces lying about a circle with the inclined threads lying in a continuous helix, the direction of the fibres in the strip extending in a circumferential direction within the closed cylindrical figure.

13. Method of forming a screwing die comprising forming a longitudinally fibered metal strip with integral transverse spaced protrusions on one face, forming thread sections in the faces of the protrusions with the threads in the general direction of the length of the strip but slightly inclined transversely with respect to the length, and bending the strip between the portions with the protrusion to form the strip into a closed figure with the protrusions inwards and the threaded faces lying about a circle with the inclined threads lying in a continuous helix.

14. Method of forming a screwing die comprising forming a longitudinally fibered metal strip with integral spaced protrusions on one face, forming convex curvatures on the other face immediately opposite the protrusions, with concave portions intervening between the convex portions, forming thread sections in the faces of the protrusions with the threads in the general direction of the length of the strip, but slightly inclined transversely with respect to the length, and bending the strip in the concave portions to reverse the curvature of these portions until they form with the concave portions opposite the protrusions a cylindrical figure of outside diameter corresponding to the radius of the convex portions, with the protrusions inwards and the threaded faces lying about a circle with the inclined threads lying in a continuous helix.

JOHN ARCHER.

(References on following page)

REFERENCES CITED

The following references are of record in the file of this patent:

UNITED STATES PATENTS

| Number | Name | Date |
|---|---|---|
| 437,385 | Smith | Sept. 30, 1890 |
| 832,380 | Hartness | Oct. 2, 1906 |
| 1,125,784 | Wells | Jan. 19, 1915 |
| 1,220,460 | Rioux | Mar. 27, 1917 |
| 1,395,252 | Beck | Nov. 1, 1921 |
| 1,465,337 | Binford | Aug. 21, 1923 |
| 1,682,996 | Smith | Sept. 4, 1928 |
| 1,771,051 | Mafera | July 22, 1930 |
| 2,151,258 | Young | Mar. 21, 1939 |
| 2,278,962 | Young | Apr. 7, 1942 |
| 2,320,573 | Doelker | June 1, 1943 |
| 2,442,908 | Sirp | June 8, 1948 |

FOREIGN PATENTS

| Number | Country | Date |
|---|---|---|
| 722,227 | France | Mar. 14, 1932 |